United States Patent [19]

Meijs

[11] 4,168,257

[45] Sep. 18, 1979

[54] PROCESS FOR TREATING WELLS WITH VISCOUS EPOXY-RESIN-FORMING SOLUTIONS

[75] Inventor: Franciscus H. Meijs, New Orleans, La.

[73] Assignee: Shell Oil Company, Houston, Tex.

[21] Appl. No.: 913,263

[22] Filed: Jun. 7, 1978

Related U.S. Application Data

[62] Division of Ser. No. 852,175, Nov. 16, 1977, Pat. No. 4,113,015.

[30] Foreign Application Priority Data

May 30, 1977 [GB] United Kingdom ............... 22756/77

[51] Int. Cl.$^2$ .............................................. C08K 5/01

[52] U.S. Cl. ......................... 260/33.6 EP; 260/37 EP

[58] Field of Search ................. 260/33.6 EP; 166/295

[56] References Cited

U.S. PATENT DOCUMENTS

| 3,294,166 | 12/1966 | Havenaar et al. .................. | 166/295 |
|---|---|---|---|
| 4,085,802 | 4/1978 | Sifferman et al. .................. | 166/295 |

*Primary Examiner*—Lewis T. Jacobs

[57] ABSTRACT

A well treating process in which a granular mass is consolidated by contacting it with an epoxy resin-forming solution that precipitates a self-curing partially-cured resin, is improved by using such a solution that contains a viscosity-increasing amount of an otherwise substantially inert oil-soluble polymer.

4 Claims, 5 Drawing Figures

PROCESS FOR TREATING WELLS WITH VISCOUS EPOXY-RESIN-FORMING SOLUTIONS

This is a division of application Ser. No. 852,175, filed Nov. 16, 1977, now U.S. Pat. No. 4,113,015, Sept. 12, 1978.

BACKGROUND OF THE INVENTION

The invention relates to: consolidating or strengthening unsolidated or poorly consolidated subterranean reservior formations; consolidating sand or gravel packs within wellbores; or consolidating masses of propping particles with hydraulically-induced fractures in subterranean earth formations.

Numerous processes have been previously proposed for testing wells with epoxy resin-forming solutions in order to consolidate masses of sand or gravel in or around the boreholes of wells. The I. H. Havenaar and F. Meijs U.S. Pat. No. 3,294,166 proposes consolidations with an epoxy resin-forming solution from which a self-curing partially cured resin is precipitated. The E. A. Richardson U.S. Pat. No. 3,339,633 proposes injecting a relatively concentrated solution of resin-forming components followed by at least an equal volume of over-flushing liquid, which is immiscible with the resin-forming components but is miscible with the solvent for the resin-forming components, in order to provide a treatment that is relatively unaffected by the presence of clay-sized solids within the interstices of the granular mass to be consolidated. The E. H. Bruist, T. W. Hamby, T. A. Simon and R. N. Tuttle U.S. Pat. No. 3,621,915 (and various subsequent patents, such as U.S. Pat. Nos. 3,857,444; 3,867,986 and 3,878,893) propose forming resin-consolidated sand or gravel packs by injecting slurries of particles that are created with a self-curing, partially-cured epoxy resin (which can be pre-applied or can be adsorbed during the injection) suspended in a carrier liquid having some but limited miscibility with a polar liquid solvent for the resin-forming components.

SUMMARY OF THE INVENTION

The present invention relates to an improved process for treating a well by injecting, into the well and into any fluid-containing permeable earth formations encountered by the well, an epoxy-resin-forming solution from which a self-curing partially-cured resin is precipitated. The improvement comprises dissolving in the resin-forming solution a kind and amount of a viscosity-increasing oil-soluble polymeric material that increases the effective viscosity of the solution to more than that of the fluid in the well or earth formation encountered by the well without significantly affecting the resin forming and precipitating properties of the solution.

The present invention also relates to an epoxy-resin-forming solution that consists essentially of (A) from about 5–30% by volume of a mixture of at least one epoxy resin having more than one vicinal epoxy group per molecule and at least one amine capable of acting as a curing agent for that resin dissolved in a liquid mixture of aromatic and non-aromatic hydrocarbons containing sufficient aromatics to keep an intermediate form of a self-curing partially-cured resin in solution throughout the time required to pump the resin-forming solution into a granular mass of materials to be treated in or around a subterranean portion of the borehole of a well and (B) also dissolved in the resin-forming solution a kind and amount of oil-soluble polymeric material that provides an effective or apparent viscosity of from about 1–150 centipoises (as measured at room temperature, at a shear rate of 51 reciprocal seconds in a Fann viscometer) without significantly affecting the resin-forming and precipitating properties of the solution.

The present invention also relates to a well treating process for emplacing and consolidating granular particles within a borehole of a well or within fractures that communicate with a well. This is done by injecting into the borehole or fractures a suspension of the granular particles in a relatively viscous epoxy-resin-forming solution of the type described above. As will be apparent to those skilled in the art, whenever such a suspension is injected into a wellbore or fracture within a permeable earth formation, at least some epoxy-resin-forming solution will be injected into a fluid-containing permeable earth formation.

DESCRIPTION OF THE INVENTION

Figure 1:
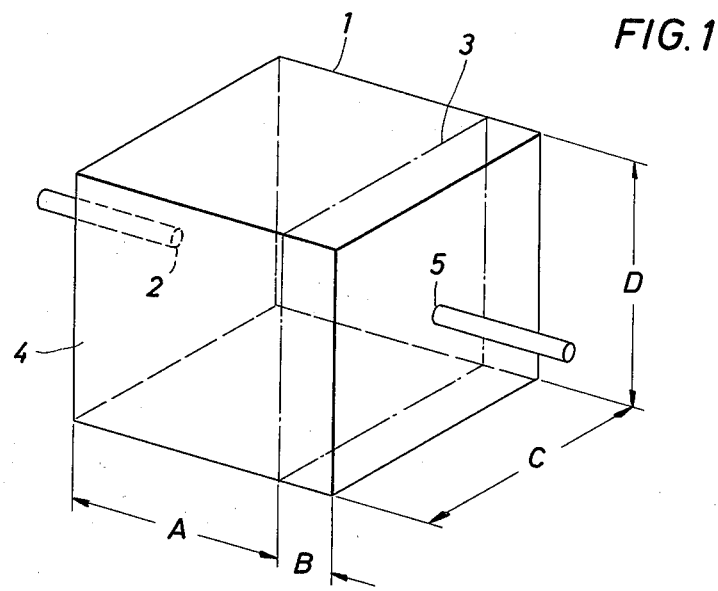
FIG. 1 is a schematic perspective view of a transparent box arranged for visually observing the flow of fluids.

This invention is, at least in part, premised on the discovery that a viscosity increasing amount of an oil-soluble polymeric material can be dissolved in an epoxy-resin-forming solution of the type from which a self-curing partially-cured resin is precipitated, without any undue alteration of either (a) the initial precipitation time, at which a self-curing partially-cured resin is precipitated, or (b) the capability of the resin-forming solution to consolidate a granular mass into a coherent structure of relatively high compressive strength. Because of that discovery it became possible to materially increase the effective viscosity of such a resin-forming solution with respect to the previously known resin-forming solutions that provided relatively high compressive strengths. Such previously known solutions were nearly as low viscous as water, e.g., about 0.74 centipoise at 60° C. With the capability of increasing the effective viscosity of the resin-forming solution it became possible to increase the effective viscosity of each of a series of pre-flush fluids without creating an adverse ratio of mobility between the last pre-flush fluid and the resin-forming solution.

In various respects, the present invention involves an improvement of the process described in U.S. Pat. No. 3,294,166 for treating a fluid-containing permeable earth formation with an epoxy-resin-forming solution from which a self-curing partially-cured resin is precipitated. The disclosures of U.S. Pat. No. 3,294,166 (which is hereafter referred to as the 166 patent) are incorporated herein by cross-reference.

The process of the 166 patent has been used for consolidating unconsolidated reservoir sands in numerous West African and U.S. oil fields. Experience has indicated that where failures have been encountered they may have been due to unstable displacements of relatively viscous crude oils by relatively low viscosity resin-forming solutions. An unfavorable mobility ratio may have resulted in leaving a significant amount of reservoir oil within portions of the reservoir interval to be consolidated. It is known that a relatively high oil saturation may cause the consolidation to be weak or substantially non-existant. The present invention is particularly useful for consolidating any unconsolidated or poorly consolidated reservoir that contains fluid having an effective viscosity which is greater than about 1 centipose at the reservoir temperature.

From general reservoir engineering experience it is known that stable and effective displacements of crude oil and water can be achieved by using, respectively, oil-miscible and water-miscible fluids having effective viscosities at least about equaling those of the fluids being displaced. In particularly suitable well treatments utilizing epoxy-resin-forming solutions that precipitate self-curing partially-cured resins, it is desirable to inject a sequence of four fluids that each have a higher effective viscosity or lower mobility than the fluid being displaced, i.e.: (1) an oil solvent, such as diesel oil, for removing oil; (2) a fluid that is mutually miscible with oil and water, such as isopropyl alcohol, for removing water; (3) an oil-miscible spacer fluid, such as a mixture of diesel oil and an aromatic hydrocarbon, for removing the mutually-miscible fluid; and (4) the resin-forming solution. For example, in an oil-containing reservoir in which the effective viscosity of the oil is about three centipoises the effective viscosities of the injected fluids (at the reservoir temperature) can advantageously be: about 3 for the oil solvent fluid: about 6 for the oil-and-water-miscible fluid; about 12 for the oil-miscible spacer fluid; and about 12 for the resin-forming solution.

In "remedial" sand control treatments, in addition to providing an effective consolidation of the oil-bearing reservoir sand, it is desirable to repack portions of the formation from which sand has been washed out during drilling or during the production of fluid from the reservoir. In prior remedial treatments, different types of sand or gravel slurries have been developed using different types of resins, different gravel concentrations, different carrying fluids, and different viscosities. In general, such sand or gravel slurries contain a self-curing liquid resin which is precoated onto the packed particles or is adsorbed on them while the slurry is being prepared or pumped into the zone to be treated. It is intended that, after the resin-coated particles have been transported into the void to be filled, the resinous coatings will undergo some deformation as the particles are pressed together, and then cure to consolidate the particles in place. But, in using such slurries, problems have been encountered.

A particular troublesome problem results from the invasion of the resin into the pores of the formation sand, where it causes a permeability impairment at the formation sand/gravel interface. At such interfaces the relatively large grains of the pack sand or gravel are pressed against the relatively small grains of the reservoir formations, and only a small invasion of a gelled or semi-gelled or partially-cured resin may drastically reduce the permeability of the relatively small pores of the reservoir sand.

Resin-forming polyepoxides suitable for use in the present invention comprise polyepoxides possessing more than one vicinal epoxy group per molecule. As discussed in the 166 patent, such polyepoxides may be saturated or unsaturated, aliphatic, cycloaliphatic, aromatic or heterocyclic.

Amines suitable for use as curing agents in the present process comprise those capable of acting as both surface active materials which impart preferential wetting properties to a solution of the resin-forming components and as curing agents for converting the polyepoxides to insoluble, infusible solid resins. As discussed in the 166 patent, preferred curing agents contain a plurality of amino nitrogen atoms that are each attached to at least one hydrogen atom. Such amines include aliphatic, cycloaliphatic, aromatic, or heterocyclic polyamines and derivatives of such amines that contain the specified amino hydrogen atoms.

Solvents suitable for use in the present invention are semi-polar liquids or mixtures of liquids capable of keeping the unreacted and self-curing, partially-cured resins in solution until the solution has been pumped into a subterranean location, and then allowing the self-curing, partially-cured resins to precipitate. As discussed in the 166 patent, a particularly suitable solvent comprises a liquid mixture of aromatic and non-aromatic hydrocarbons containing at least about 50% by volume of aromatic hydrocarbons in a proportion sufficient to maintain the ungelled intermediate resin product in solution while the solution is being transported to a subterranean region and then cause the precipitation of a somewhat further gelled intermediate resin product within a relatively few hours (such as about 2–12 hours) at the reservoir temperature (when the resin-forming solution is relatively dilute, e.g., the concentration of the resin-forming components in the solution is from about 5–20% by volume).

As known to those skilled in the art, and as is further discussed in the 166 patent, such epoxy-resin-forming solutions can advantageously contain additional components such as polymerization accelerators, polymerization retarders, or the like, to modify or control the initial resin separation time and/or subsequent curing time, etc. Suitable accelerators comprise phenols, phenolic compounds, salicylic acid, and the like. Suitable retarders comprise ketones such as acetone and its lower homologs. Where desirable, resin-to-sand bond strength enhancing agents, such as epoxy- or amino-functional silanes or the like, can be included within the solution.

Where it is desirable to inject a significant volume of the resin-forming solution into an oil-containing reservoir formation (which usually also contains water) to consolidate a significant volume of the reservoir sand, pre-flush solutions are preferably injected to displace oil and water from the zone to be treated. The oil-displacing solution is a liquid oil solvent having significant miscibility with the reservoir oil. Diesel oil and/or mixtures of diesel oil and kerosene containing significant proportions of aromatic hydrocarbons are particularly suitable oil-displacing fluids. Water-displacing fluids preferably comprise liquids which are miscible with both oil and water, such as the lower alcohols, an oil solvent of a cationic surfactant, a lower ketone such as acetone, or the like.

Oil-soluble viscosity-increasing polymeric materials suitable for use in this invention comprise such oil-soluble polymers which are substantially completely soluble in the resin-forming solutions when they are initially prepared and also when they contain significant proportions of dissolved intermediate, self-curing partially-cured epoxy resin. Particularly suitable oil-soluble viscosity-increasing polymers have molecular weights in the range of from about 50,000–1,000,000. Examples of such polymers include isoprenestyrene copolymers, polyisobutene polymers, polymethacrylate polymers, olefinic copolymers, and synthetic rubbers such as butadiene-styrene copolymers. The isoprene-styrene copolymer, SHELLVIS-50 (available from Shell) is a particularly suitable thickening agent which exhibits a good shear resistance and is thermally stable at temperatures up to about 250° C. It has been found that polymer-containing resin-forming solutions containing about 15% by volume epoxy-resin forming components can be suitably thickened to effective viscosities of about 95 centipoises at 23° C., and 65 centipoises at 70° C., when the concentration of SHELLVIS-50 is about 7 grams of the polymer per 90 milliliters of the solution. Polyvinyl pyrolidone polymers are particularly suitable for thickening resin-forming solutions and/or pre-flush liquids which comprise or contain a lower alcohol such as isopropyl alcohol. In general, the concentration of the viscosity increasing polymer is preferably from about 20 to 70 grams per 100 milliliters of solution.

Where preflushes are used it is preferable that each fluid being injected has an effective viscosity at least equaling that of the fluid in the well borehole or reservoir to be displaced by the fluid being injected. In a particularly preferred sequence, diesel oil containing sufficient SHELLVIS-50 polymer to provide an effective viscosity at least equaling that of the reservoir oil is injected to displace oil. Isopropyl alcohol containing sufficient polyvinyl pyrrolidone to provide an effective viscosity at least equaling that of the injected diesel oil solution is injected to displace the latter. A spacer fluid consisting of a solution of aromatic and non-aromatic hydrocarbons and sufficient SHELLVIS-50 polymer to provide a viscosity at least equaling that of the isopropyl alcohol solution is injected to displaced the latter. And, then an epoxy-resin-forming solution containing sufficient SHELLVIS-50 polymer to provide an effective viscosity at least equaling that of the spacer fluid is injected to displace the latter and effect the consolidation treatment.

When the present invention is used for installing a consolidated mass of granular particles within a selected location, such as a downhole portion of a well borehole or fracture in a subterranean earth formation, the use of the present relatively viscous solution of significant but relatively low proportions of resin-forming components avoids many of the disadvantages of the previously proposed procedures for conducting such operations. Epoxy-resin-forming solutions containing about 15% by volume of resin-forming agents, about 70 grams of SHELLVIS-50 polymer, about 1800 grams of sand grains (having an average grain size of about 1 millimeter) per liter of solution, and a mixture of liquid aliphatic and aromatic hydrocarbons, provide suspensions which are stable for a period of at least several hours at room temperature. The compressive strengths of consolidated masses of sand grains formed by such solutions have been found to be only slightly less than those consolidated with the same type of solution with the SHELLVIS-50 polymer omitted.

In using the present process to install a sand or gravel pack no special measures need to taken to prevent the carrying and consolidating liquid from entering the pores of a subterranean earth formation surrounding a wellbore or fracture. The relatively low concentration of resin-forming materials ensures that the permeability of the earth formation will not be unduly impaired, even in a formation of relatively low permeability. In a particularly preferred procedure, such a thickened resin-forming solution is preceded by a slug of buffer liquid, preferably one comprising a substantially equally-thickened portion of substantially the same viscosity as the resin-forming solution, but free of the resin-forming components. In forming consolidated masses of fracture-propping particles, such a buffer is preferably spotted between the slurry of propping particles in the resin-forming solution and any fracturing fluids, and/or fracture acidizing fluids, or the like fluids, which are injected ahead of that particle-containing slurry. In general, in forming the consolidated masses, the slurries of particles in thickened resin-forming solutions are preferably injected into the borehole or fractures until the suspended particles are screened-out against the walls of the borehole or fracture. Suitable procedures and equipment for injecting slurries of packing or propping particles to causes such "sand-outs" are well known and readily available to those skilled in the art. In using the present process, each slurry of particles in a thickened resin-forming solution is preferably followed by a slug of a similarly thickened resin-forming solution free of the particles. When a sand-out is obtained, the injecting of fluid is preferably interrupted for a time sufficient to allow a precipitating and curing of the resin within the pores of the gravel pack or mass of propping particles, and, where the surrounding earth formation is permeable, also within the pores of the surrounding earth formation.

Laboratory tests have been conducted to study the stability of the displacement of a reservoir fluid at various ratios of $$\frac{\text{viscosity displacement fluid}}{\text{viscosity reservoir fluid}}$$

with various injection rates (of the displacement fluid). The tested displacement fluids consisted of liquid compositions comprising mixtures of various amounts of "SHELLVIS"-50 oil-soluble polymer in an epoxy-resin-forming solution. That solution ("Fluid A") consisted of equal parts by volume of the following three components:

(1) a xylene solution containing 34.2%vol "EPIKOTE" 828 epoxy resin and 0.75 %vol "Dow Corning Z-6040" silane;

(2) a solution of "DDM" amine curing agent in a solvent mixture comprising:

11.4 %vol of the curing agent,

20 %vol acetone,

6 %vol isopropyl alcohol, and 62.6 %vol xylene; and (3) a solvent mixture of (in parts by volume) 31 parts xylene, 69 parts kerosene and 33 parts of a solution containing 175 g phenol and 150 ml metacresol per cash 190 ml xylene and 500 ml kerosene.

In "Fluid A" the concentration of the resin-forming components was about 15% by volume.

FIG. 1 shows schematically (in perspective view) a transparent box 1 used for visualizing the displacement of a reservoir formation fluid by various treating compositions.

The box dimensions were:

A=22 cm

B=8 cm

C=5 cm

D=30 cm

The opening 2 in the left vertical wall of the box had a diameter of 0.08 cm and simulated a perforation in a well casing. A vertical screen 3 consisting of a perforated plate with a small wire netting (200 mesh) allowed horizontal fluid flow in a pack 4 of crushed glass particles (average size 200 mm). The walls of the box were made of transparent material to allow study of the flow of a dyed displacement fluid that was injected through opening 2 into the interior of the box 1 for displacing a reservoir or formation fluid present in the pore space of the pack 4 toward the screen 3. After passing through the screen, the displaced fluid was removed from the box via opening 5.

The fluid representing the formation fluid in the pore space of the box was ONDINA oil (consisting of paraffinic hydrocarbons) having a viscosity of 25 cP at the test conditions.

Four displacement tests were carried out at room temperature with Fluid A mixed with the indicated proportions of SHELLVIS-50 polymer.

| Test | Fluid A | Apparent viscosity at 51 sec. $^{-1}$ | Displacement rate cm$^3$/sec |
|---|---|---|---|
| 1 | + 20 g SHELLVIS/liter | 13 cP | 2.5 |
| 2 | + 50 g SHELLVIS/liter | 40 cP | 2.5 |
| 3 | + 70 g SHELLVIS/liter | 120 cP | 2.5 |
| 4 | + 70 g SHELLVIS/liter | 120 cP | 1.0 |

Figure 2:
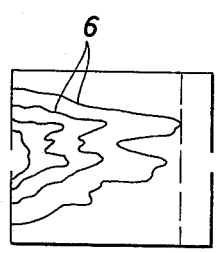
FIGS. 2–5 are illustrations of the boundary lines between various fluids being displaced into and displaced from that box at various stages of the displacements.
Figure 3:
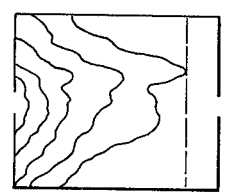
Figure 4:
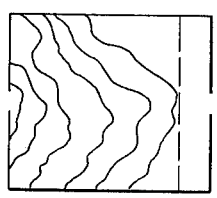
Figure 5:
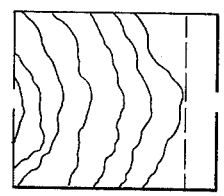

FIG. 2 shows a side view of the box 1 of FIG. 1, wherein the boundary lines 6 indicate the position of the displacement front between the formation fluid and the treating fluid of test 1 at subsequent time intervals. FIG. 3 shows the various positions of the displacement front when applying an increased amount of viscosifying agent (test 2), whereas FIG. 4 shows the positions of the displacement front at a still greater amount of viscosifying agent (test 3). FIG. 5 shows the displacement of the reservoir fluid when using the same treating fluid as in test 3, but at a considerable lower injection rate.

The tests indicated that the displacement becomes more stable and less fingering if the treating composition contained the higher concentrations of the viscosifying agent, such as those of tests 3 and 4. The increased uniformity of reservoir fluid displacement will result in the absence of weak spots in a formation which is consolidated by a so-viscosified resin-forming solution.

Tests were made of the effect of the viscosifying agent SHELLVIS-50 polymer on the compressive strength of the sand grains consolidated by a resin-forming solution containing various amounts of SHELLVIS-50. Packs of sand particles resembling a subterranean earth formation sand were made in glass vessels. Silver sand (a well-washed silica sand) was used for this purpose, and each pack had a permeability of about 8 darcies. Subsequently the packs were flushed with treating fluids consisting of the above Fluid A having added thereto 2, 4 and 6 grams "SHELLVIS"-50 polymer per 100 ml, respectively. After curing each pack for one night at 65° C., the consolidated cores thus obtained were each cut into three pieces. The unconfined compressive strengths of the pieces are listed in the following table:

| "SHELLVIS"-50 concentration | Unconfined compressive strength kg/cm$^2$ | | |
|---|---|---|---|
| 8/100 ml | top | middle | bottom |
| 0 | not determined | 185 | not determined |
| 2 | 165 | 163 | 165 |
| 4 | 190 | 185 | 175 |
| 6 | 150 | 170 | 150 |

The tests indicate that when a concentration of 6 g "SHELLVIS"-50 per 100 ml is dissolved in an epoxy-resin-forming treating fluid such as Fluid A, the compressive strength of a granular earth formation consolidated by that fluid is substantially unaffected.

In general, where it is desirable to benefit from using a given epoxy-resin-forming solution that is relatively viscous, tests should be made to correlate the treatment design with respect to the extent to which the resin-forming and precipitating properties of the solution will be affected by the amount of a particular oil-soluble viscosity increasing resin that would be needed to provide a particular viscosity. Where necessary, adjustments should be made regarding the kind and amounts of epoxide, as described in the 166 patent; and, alternatively or additionally, a different thickener should be used and/or changes made in the contemplated rates, volumes or compositions of fluids to be injected, in order to avoid a significant degradation of the resin-forming and precipitating properties of the resin-forming solution. In particular, the composition of the solution is adjusted with respect to the temperature, injectivity and fracturing pressure of a subterranean reservoir to be treated, so that the proportions of aromatic and non-aromatic hydrocarbons and oil-soluble polymer in the solution provide (a) an effective viscosity at which the solution can be injected into the reservoir at a selected rate in response to a pressure of less than the reservoir fracturing pressure, and (b) a capability of keeping in solution the partially-cured epoxy resin that is forming while the solution is being injected into the reservoir at the selected rate.

What is claimed is:

1. An epoxy resin-forming solution which consists essentially of:

from about 5 to 30% by volume of a mixture of at least one epoxy resin having more than one vicinal epoxy group per molecule and at least one amine capable of curing that epoxy resin;

said resin and amine being dissolved in a mixture of aromatic and non-aromatic hydrocarbons containing at least about 50% by weight aromatic hydrocarbon in proportions capable of maintaining a self-curing partially-cured epoxy resin in solution while the solution is pumped into a subterranean location and then precipitating a self-curing partially-cured epoxy resin; and, also dissolved in said mixture of hydrocarbons, sufficient oil-soluble isoprene-styrene copolymer to increase the effective viscosity of the solution to from about 1 to 150 centipoises at from about 20° and 120° C., as measured at a shear rate of 51 reciprocal seconds in a Fann viscosimeter.

2. The composition of claim 1 in which the effective viscosity of the solution is at least about 50 centipoises and particulate solids are suspended in the solution.

3. The composition of claim 2 in which the suspended particles have an average diameter of about 1 millimeter.

4. The solution of claim 1 in which:

the composition of the solution is adjusted with respect to the temperature, injectivity and fracturing pressure of a subterranean reservoir to be treated, so that the proportions of aromatic and non-aromatic hydrocarbons and oil-soluble polymer in the solution provide (a) an effective viscosity at which the solution can be injected into the reservoir at a selected rate in response to a pressure of less than the reservoir fracturing pressure, and (b) a capability of keeping in solution the partially-cured epoxy resin that is forming while the solution is being injected into the reservoir at the selected rate.

* * * * *